(12) United States Patent
Park et al.

(10) Patent No.: US 12,086,906 B2
(45) Date of Patent: Sep. 10, 2024

(54) METHOD AND APPARATUS FOR SIMULATING SHARPNESS OF IMAGE BOUNDARY

(71) Applicant: Samsung Display Co., LTD., Yongin-si (KR)

(72) Inventors: Sunyoung Park, Yongin-si (KR); Tae Ho Kim, Yongin-si (KR); Min Tak Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 125 days.

(21) Appl. No.: 17/869,716

(22) Filed: Jul. 20, 2022

(65) Prior Publication Data

US 2023/0119546 A1  Apr. 20, 2023

(30) Foreign Application Priority Data

Oct. 19, 2021 (KR) .................. 10-2021-0139730

(51) Int. Cl.
  *G06T 11/00* (2006.01)
  *G06T 7/90* (2017.01)
(52) U.S. Cl.
  CPC .............. *G06T 11/001* (2013.01); *G06T 7/90* (2017.01); *G06T 2207/10024* (2013.01)

(58) Field of Classification Search
  CPC .............................. G06T 7/90; G06T 11/001
  See application file for complete search history.

(56) References Cited

U.S. PATENT DOCUMENTS

| 11,270,507 B1* | 3/2022 | Lambert | G06T 5/73 |
| 2009/0067709 A1* | 3/2009 | Gross | G06T 7/136 |
| | | | 382/166 |
| 2019/0253689 A1* | 8/2019 | Yanai | G06T 5/73 |

FOREIGN PATENT DOCUMENTS

KR  10-1746850  5/2012

* cited by examiner

*Primary Examiner* — Charles Tseng
(74) *Attorney, Agent, or Firm* — KILE PARK REED & HOUTTEMAN PLLC

(57) ABSTRACT

A method for simulating sharpness of an image boundary including setting a boundary pattern including a boundary line between black and white, and a unit pattern including arrangement information of pixels; calculating simulation grayscale data for implementing the boundary pattern by using the unit pattern; and obtaining a sharpness index for the boundary line based on a contrast sensitivity function (CSF) and brightness data extracted from the simulation grayscale data.

18 Claims, 9 Drawing Sheets

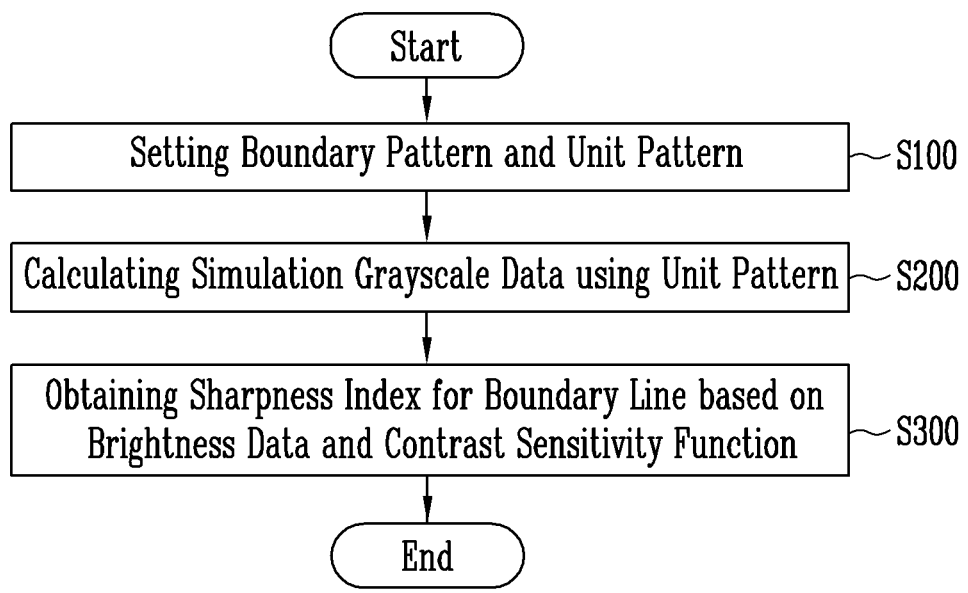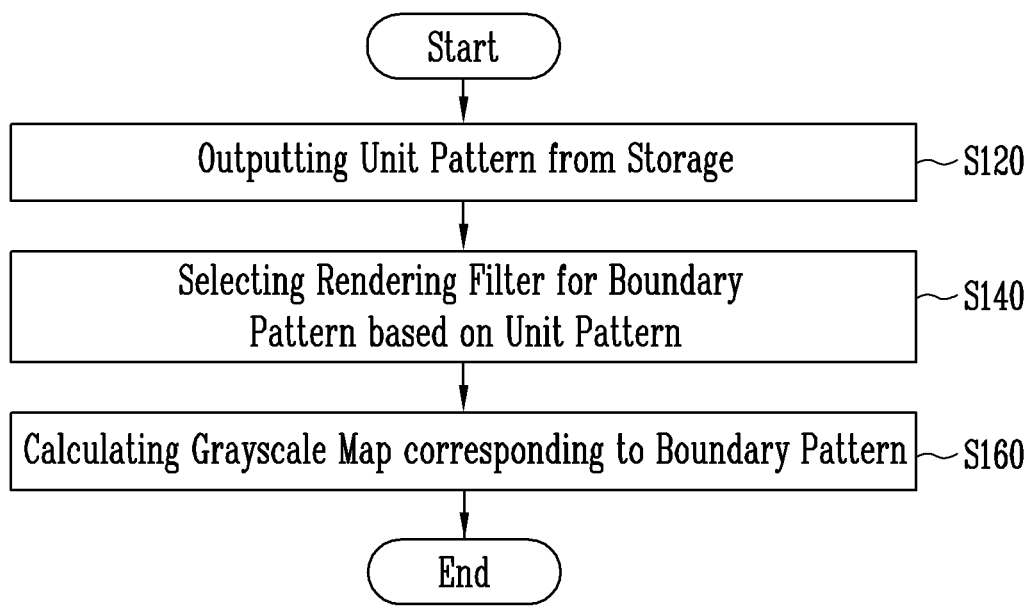

METHOD AND APPARATUS FOR SIMULATING SHARPNESS OF IMAGE BOUNDARY

CROSS REFERENCE TO RELATED APPLICATION

The application claims priority from and the benefit of Korean Patent Application No. 10-2021-0139730, filed Oct. 19, 2021, which is hereby incorporated by reference for all purposes as if fully set forth herein.

BACKGROUND

Field

Embodiments of the invention relate generally to a method and apparatus for simulating sharpness of an image boundary.

Discussion of the Background

As the information society develops, the demand for a display device for displaying an image is increasing in various forms. For example, the display device is applied to various electronic devices such as a smart phone, a digital camera, a notebook computer, a navigation system, and a smart television.

The display device includes various types of pixel arrangement structures, and displays an image using an optimal rendering method for each pixel arrangement structure.

On the other hand, contrast modulation (CM, or sharpness) is a value numerically indicating how sharply a display device can distinguish white and black by contrasting them. Such sharpness may vary according to a pixel arrangement structure and a rendering method, and the display device may display a high-quality image as the sharpness increases. The pixel arrangement structure and the rendering method are not easy to change after product design and manufacturing. Therefore, a technology to derive optimal design values by sufficiently simulating is required before the product design.

The above information disclosed in this Background section is only for understanding of the background of the inventive concepts, and, therefore, it may contain information that does not constitute prior art.

SUMMARY

Embodiments of the present invention provide a method for simulating sharpness of an image boundary that may obtain a sharpness index by reflecting a boundary pattern, an arrangement structure of pixels, and human visual perception characteristics.

Embodiments of the present invention also provide an apparatus for simulating sharpness of an image boundary that may obtain a sharpness index by reflecting a boundary pattern, an arrangement structure of pixels, and human visual perception characteristics.

Additional features of the inventive concepts will be set forth in the description which follows, and in part will be apparent from the description, or may be learned by practice of the inventive concepts.

An embodiment of the present invention provides a method for simulating sharpness of an image boundary including setting a boundary pattern including a boundary line between black and white, and a unit pattern including arrangement information of pixels; calculating simulation grayscale data for implementing the boundary pattern by using the unit pattern; and obtaining a sharpness index for the boundary line based on a contrast sensitivity function (CSF) and brightness data extracted from the simulation grayscale data.

The setting the boundary pattern and the unit pattern may include outputting the unit pattern from a storage; selecting a rendering filter for the boundary pattern based on the unit pattern; and calculating a grayscale map corresponding to the boundary pattern based on the rendering filter.

The calculating the simulation grayscale data may include implementing a size of the boundary pattern by repeatedly arranging the unit pattern; determining a weight of each of the pixels based on an area of each of the pixels included in the unit pattern; and obtaining the simulation grayscale data by respectively applying the weight of corresponding pixels to grayscale values of coordinates of the grayscale map.

Data of each coordinate of the simulation grayscale data may be a product of a grayscale value of the coordinate and the weight.

The obtaining the sharpness index may include obtaining the brightness data having a brightness component extracted from the simulation grayscale data; frequency converting the brightness data into frequency data; generating brightness recognition data by multiplying the frequency data by a filter of the contrast sensitivity function and performing inverse frequency conversion; and calculating the sharpness index based on a maximum value of the brightness recognition data, a minimum value of the brightness recognition data, a position corresponding to the maximum value, and a position corresponding to the minimum value in a predetermined boundary area corresponding to the boundary line.

The obtaining the brightness data may include calculating values of an RGB color space by applying a gamma function to the simulation grayscale data; and converting the RGB color space into an XYZ color space to extract a brightness component from values of the XYZ color space.

The boundary area may be an area having a predetermined margin around the boundary line.

The contrast sensitivity function may be determined based on a pixel per inch (PPI) of an image, a viewing distance from a viewer, and a viewing angle.

The calculating the sharpness index may include calculating preliminary indices that are sharpness indices of respective points set on the boundary line; and determining an average of the preliminary indices as the sharpness index of the boundary line.

A preliminary index of a first point of the boundary line may be derived as a value obtained by dividing a difference between the maximum value and the minimum value of the brightness recognition data within an area set around the boundary line by a distance between the position corresponding to the maximum value and the position corresponding to the minimum value.

The boundary line of the boundary pattern may be periodically rotated at a predetermined angle with respect to a predetermined reference boundary pattern.

The grayscale values of the coordinates of the grayscale map may be changed according to the rotation of the boundary line, and sharpness indices for boundary line angles may be obtained.

An average of the sharpness indices for the boundary line angles may be determined as the sharpness index.

Another embodiment of the present invention provides an apparatus for simulating sharpness of an image boundary including a storage storing unit patterns each including arrangement information of pixels; a grayscale data generator calculating simulation grayscale data using a boundary pattern including a boundary line between black and white, and a selected unit pattern of the unit patterns; a brightness recognition data generator extracting brightness data from the simulation grayscale data and generating brightness recognition data based on the brightness data and a contrast sensitivity function; and a sharpness index calculator calculating a sharpness index based on a difference between a maximum value and a minimum value of the brightness recognition data in a predetermined boundary area corresponding to the boundary line.

The grayscale data generator may calculate a grayscale map by applying a rendering filter corresponding to the selected unit pattern to the boundary pattern, and calculate the simulation grayscale data by applying a weight corresponding to the pixels of the selected unit pattern to grayscale values of the grayscale map.

The grayscale data generator may calculate the simulation grayscale data by changing a boundary line angle with respect to a predetermined reference boundary pattern.

The brightness recognition data generator may calculate values of an RGB color space by applying a gamma function to the simulation grayscale data, convert the RGB color space into an XYZ color space to obtain the brightness data having a brightness component extracted from values of the XYZ color space, frequency convert the brightness data into frequency data, and generate the brightness recognition data by multiplying the frequency data by a filter of the contrast sensitivity function and performing inverse frequency conversion.

The brightness recognition data generator may determine the contrast sensitivity function based on a pixel per inch (PPI) of an image, a viewing distance from a viewer, and a viewing angle.

The sharpness index calculator may calculate preliminary indices that are sharpness indices of respective points set on the boundary line, and determine an average of the preliminary indices as the sharpness index.

A preliminary index of a first point of the boundary line may be derived as a value obtained by dividing a difference between the maximum value and the minimum value of the brightness recognition data within an area set around the boundary line by a distance between a position corresponding to the maximum value and a position corresponding to the minimum value.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

FIG. 1 is a flowchart illustrating a method for simulating sharpness of an image boundary according to embodiments of the present invention.

FIG. 2 is a flowchart illustrating an example of a method of setting a boundary pattern and a unit pattern in the method of FIG. 1.

DETAILED DESCRIPTION

Figure 3A:
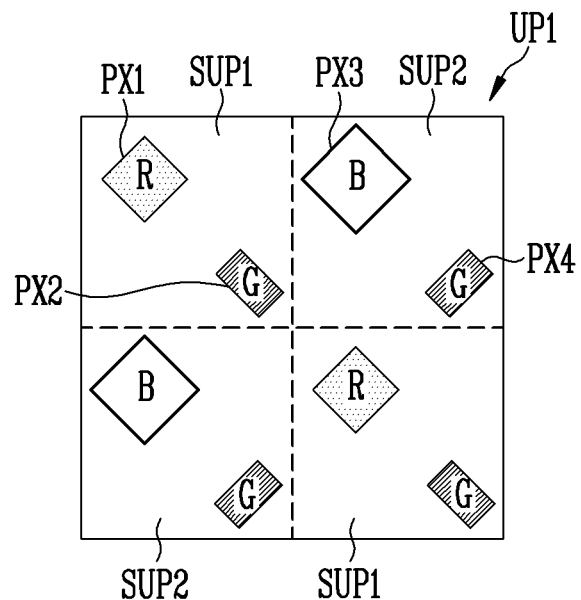
FIGS. 3A, 3B, 3C, and 3D are diagrams illustrating examples of unit patterns.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z—axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments of the present invention will be described in more detail with reference to the accompanying drawings. The same reference numerals are used for the same elements in the drawings, and duplicate descriptions for the same elements are omitted.

FIG. 1 is a flowchart illustrating a method for simulating sharpness of an image boundary according to embodiments of the present invention.

Referring to FIG. 1, a method for simulating sharpness of an image boundary may include setting a boundary pattern and a unit pattern (S100); calculating simulation grayscale data using the unit pattern (S200); and obtaining a sharpness index for a boundary line based on brightness data and a contrast sensitivity function (S300).

The boundary pattern and the unit pattern may be set in response to an external input signal (S100). The boundary pattern may be expressed as grayscale data corresponding to an image including a boundary line between black and white. The boundary line of the boundary pattern may have a shape inclined in a range of 0° to 360° with respect to a predetermined reference (or a reference boundary pattern). The method for simulating the sharpness of the image boundary may calculate sharpness of the boundary line (for example, a degree of abrupt change in luminance of a boundary portion) for each shape of the boundary pattern.

The unit pattern may include arrangement information of pixels. The unit pattern may be a minimum unit of a pixel arrangement structure.

In an embodiment, boundary patterns and unit patterns having various structures may be stored in a storage (or a memory), and one of the stored boundary patterns and one of the stored unit patterns may be selected in response to the external input signal.

The simulation grayscale data for implementing the boundary pattern may be calculated using the unit pattern (S200). The boundary pattern may provide a larger image size than the unit pattern. Accordingly, the size of the boundary pattern may be implemented by repeatedly arranging the unit pattern. In addition, coordinate information of a pixel generated by a combination of the boundary pattern and the unit pattern may be generated to generate the simulation grayscale data.

Grayscale data corresponding to the coordinate information of the pixel may be generated based on the pixel and weight information of the unit pattern and grayscale information of the boundary pattern, and the grayscale data may be expressed as the simulation grayscale data.

Thereafter, the sharpness index for the boundary line may be obtained based on the brightness data and the contrast sensitivity function (S300).

The brightness data may be extracted by data conversion of the simulation grayscale data. The contrast sensitivity function may be determined based on a pixel-per-inch (PPI) of an image, a viewing distance of a viewer, and a viewing angle. That is, boundary sharpness may be numerically and quantitatively calculated based on a result in which the contrast sensitivity function representing human visual perception characteristics that change according to a predetermined condition is reflected in the brightness data calculated based on an image data.

Hereinafter, the method of simulating the sharpness of an image boundary according to embodiments of the present invention will be described in detail.

FIG. 2 is a flowchart illustrating an example of a method of setting a boundary pattern and a unit pattern in the method of FIG. 1. FIGS. 3A to 3D are diagrams illustrating examples of unit patterns. FIGS. 4A to 4D are diagrams illustrating examples of boundary patterns.

Referring to FIGS. 2 to 4D, a method of setting a boundary pattern and a unit pattern may include outputting the unit pattern from the storage unit (S120); selecting a rendering filter for the boundary pattern based on the unit pattern (S140); and calculating a grayscale map corresponding to the boundary pattern based on the rendering filter (S160).

In an embodiment, one of unit patterns UP1 to UP4 stored in the storage may be output in response to the external input signal (S120). As shown in FIGS. 3A to 3D, various types of unit patterns UP1 to UP4 may be stored in the storage. Each of the unit patterns UP1 to UP4 may include a plurality of pixels PX1, PX2, PX3, and PX4. The unit patterns UP1 to UP4 may be for calculating sharpness through simulation. Each of the unit patterns UP1 to UP4 may have an enlarged size of a pixel structure that can be actually applied. That is, an image of the unit patterns UP1 to UP4 may be implemented using any display device capable of displaying a screen.

A first pixel PX1, a second pixel PX2, and a third pixel PX3 may emit light of a first color, light of a second color, and light of a third color, respectively. The light of the first color, the light of the second color, and the light of the third color may be different colors, and may be one of red R, green G, and blue B. In an embodiment, the fourth pixel PX4 may emit light having the same color as that of the second pixel PX2.

In an embodiment, as shown in FIG. 3A, a first unit pattern UP1 may include two first sub-unit patterns SUP1 and two second sub-unit patterns SUP2. A first sub-unit pattern SUP1 may be disposed adjacent to a second sub-unit pattern SUP2 in a row direction and a column direction.

The first pixel PX1 and the second pixel PX2 may be disposed on the first sub-unit pattern SUP1, and the third pixel PX3 and the fourth pixel PX4 may be disposed on the second sub-unit pattern SUP2. In addition, each of emission areas of the first to fourth pixels PX1 to PX4 may have a substantially rectangular planar structure. The sizes of the first to third pixels PX1, PX2, and PX3 may be different from each other. The fourth pixel PX4 and the second pixel PX2 may have left-right symmetrical shapes.

Figure 3B:
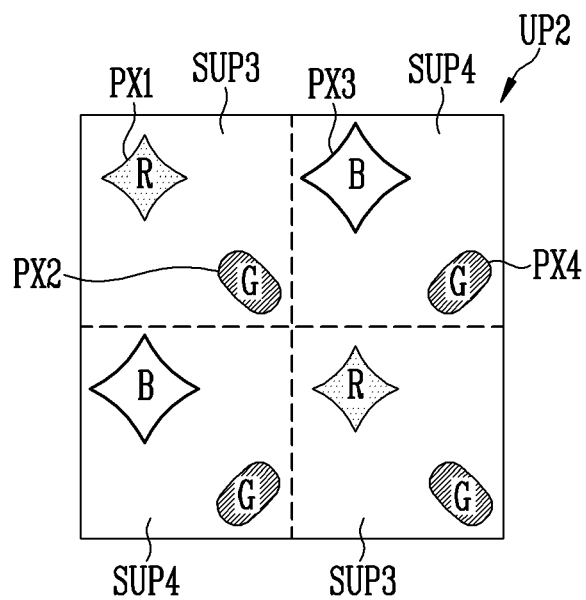

In an embodiment, as shown in FIG. 3B, a second unit pattern UP2 may include two third sub-unit patterns SUP3 and two fourth sub-unit patterns SUP4. A third sub-unit pattern SUP3 and a fourth sub-unit pattern SUP4 may be disposed adjacent to each other in the row direction and the column direction. An arrangement pattern of the pixels PX1 to PX4 of the second unit pattern UP2 may be substantially the same as that of the first unit pattern UP of FIG. 3A, and only the shapes of the pixels PX1 to PX4 may be different. For example, the first pixel PX1 and the third pixel PX3 may have sides that are concave toward the center, and the second pixel PX2 and the fourth pixel PX4 may include sides that are oval or convex.

Figure 3C:
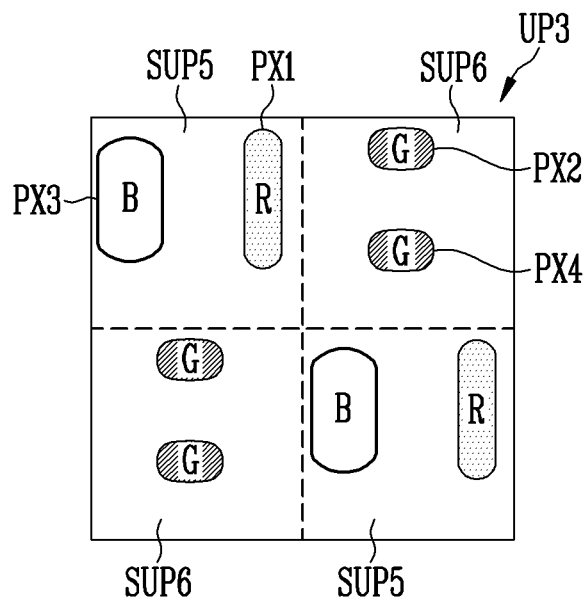

In an embodiment, as shown in FIG. 3C, a third unit pattern UP3 may include two fifth sub-unit patterns SUP5 and two sixth sub-unit patterns SUP6. A fifth sub-unit pattern SUP5 and a sixth sub-unit pattern SUP6 may be disposed adjacent to each other in the row direction and the column direction.

The third pixel PX3 and the first pixel PX1 may be arranged in the row direction in the fifth sub-unit pattern SUP5. The second pixel PX2 and the fourth pixel PX4 may be arranged in the column direction in the sixth sub-unit pattern SUP6. The fifth sub-unit pattern SUP5 and the sixth sub-unit pattern SUP6 may be disposed adjacent to each other in the row direction and the column direction.

In an embodiment, the first pixel PX1 and the third pixel PX3 may have an elongated shape (for example, a polygonal shape) in the column direction. The second pixel PX2 and the fourth pixel PX4 may have a shape in which left and right widths are greater than vertical widths. The sizes of the first to third pixels PX1, PX2, and PX3 may be different from each other. The sizes of the second pixel PX2 and the fourth pixel PX4 may be substantially the same.

Figure 3D:
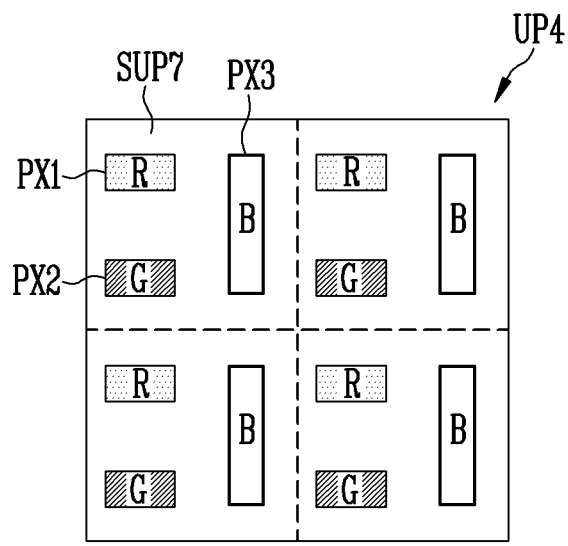

In an embodiment, as shown in FIG. 3D, a fourth unit pattern UP4 may include a seventh sub-unit pattern SUP7. The seventh sub-unit pattern SUP7 may be arranged in a 2×2 form. The seventh sub-unit pattern SUP7 may include the first pixel PX1 and the second pixel PX2 arranged vertically and the third pixel PX3 adjacent to the first pixel PX1 and the second pixel PX2 in the row direction. The first to third pixels PX1, PX2, and PX3 may have a rectangular shape.

However, this is merely an example, and the unit patterns UP1 to UP4 are not limited thereto, and may be extended to various pixel shapes and arrangement structures. Accordingly, a process of simulating boundary sharpness for various pixel structures may be performed.

The boundary pattern may include the boundary line between black and white. The boundary pattern may include a black area BA and a white area WA, and a boundary between the black area BA and the white area WA may be defined as the boundary line.

Figure 4A:
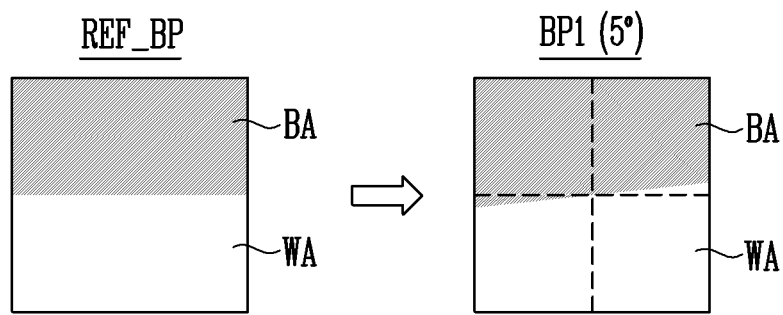
FIGS. 4A, 4B, 4C, and 4D are diagrams illustrating examples of boundary patterns.
Figure 4B:
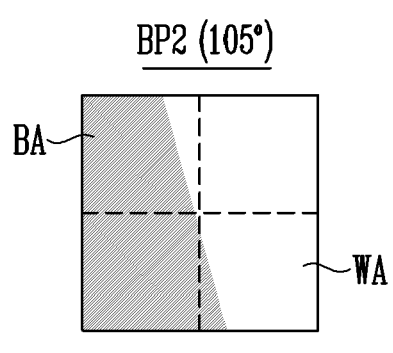
Figure 4C:
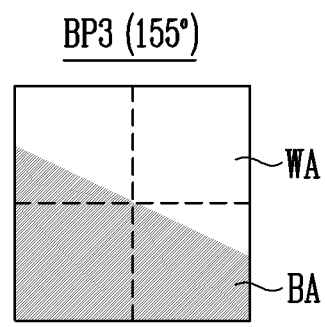
Figure 4D:
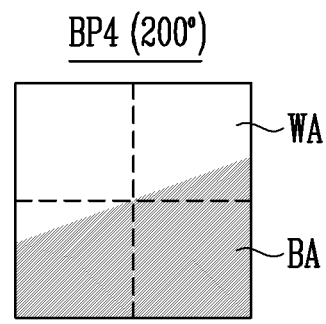

In an embodiment, the boundary pattern may have a shape in which the boundary line of a predetermined reference boundary pattern REF_BP is rotated. For example, as shown in FIG. 4A, a first boundary pattern BP1 may be a pattern in which the reference boundary pattern REF_BP is rotated counterclockwise by about 5 degrees. As shown in FIG. 4B, a second boundary pattern BP2 may be a pattern in which the reference boundary pattern REF_BP is rotated counterclockwise by about 105 degrees. As shown in FIG. 4C, a third boundary pattern BP3 may be a pattern in which the reference boundary pattern REF_BP is rotated counterclockwise by about 155 degrees. As shown in FIG. 4D, a fourth boundary pattern BP4 may be a pattern in which the reference boundary pattern REF_BP is rotated counterclockwise by about 200 degrees.

The sharpness of the image boundary reflecting the visual perception characteristics may change depending on a boundary line angle. Accordingly, driving for calculating the sharpness may be performed for each of the first to fourth boundary patterns BP1 to BP4.

However, this is an example, and the shapes of the boundary patterns BP1 to BP4 are not limited thereto, and the boundary line angle may be set to various values within a range of 0 degrees to 360 degrees.

On the other hand, the size of the boundary pattern may be greater than the size of the unit pattern. For example, the boundary pattern may be simulated (or implemented) by an arrangement of the unit pattern and values of grayscale data corresponding to pixels included in the unit pattern.

First, the rendering filter for the boundary pattern may be selected based on the unit pattern (S140). The boundary pattern may be expressed based on the arrangement of the unit pattern. For example, when the first boundary pattern BP1 and the first unit pattern UP1 are selected, an image of the first boundary pattern BP1 may be simulated by being implemented by a display panel configured with the first unit pattern UP1. (See FIG. 6)

For example, when the boundary pattern is implemented as one of the above-described unit patterns UP1, UP2, UP3, and UP4, an image by a combination of red R, green G, and blue B may be implemented by sharing a light emitting pixel with an adjacent sub-unit pattern. In particular, when the boundary line is inclined as in the first to fourth boundary patterns BP1 to BP4, since the black area BA and the white area WA may not be clearly distinguished in units of unit patterns and/or sub-unit patterns, rendering of the image (or image data) may be required.

Accordingly, the rendering filter corresponding to the unit pattern may be selected. For example, various types of known rendering filters may be stored in the storage such as a memory. For example, rendering filters corresponding to each of the boundary patterns may be stored in a lookup table format. Alternatively, any one of the stored rendering filters may be selected in response to the external input signal.

The grayscale map corresponding to the selected boundary pattern may be calculated based on the selected rendering filter (S160). For example, when the first boundary pattern BP1 is selected, the grayscale map for implementing the first boundary pattern BP1 may be calculated.

The grayscale map may be data representing grayscale values corresponding to coordinates of pixels. For example, coordinates for the boundary pattern may be set based on the selected unit pattern, and grayscale values to which the rendering filter is applied to corresponding coordinates may be determined. That is, the grayscale values to be applied to the first pixel PX1, the second pixel PX2, the third pixel PX3, and the fourth pixel PX4 may be determined according to positions of the first pixel PX1, the second pixel PX2, the third pixel PX3, and the fourth pixel PX4.

In this way, the rendering filter corresponding to the selected unit pattern may be applied to grayscale data of the boundary pattern.

Figure 5:
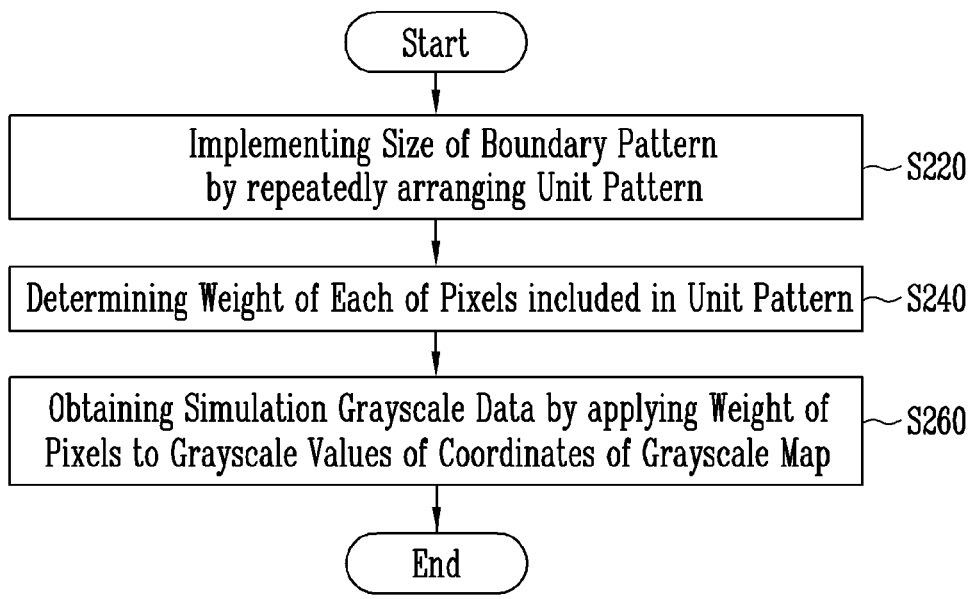
FIG. 5 is a flowchart illustrating an example of a method of calculating simulation grayscale data in the method of FIG. 1.
Figure 6:
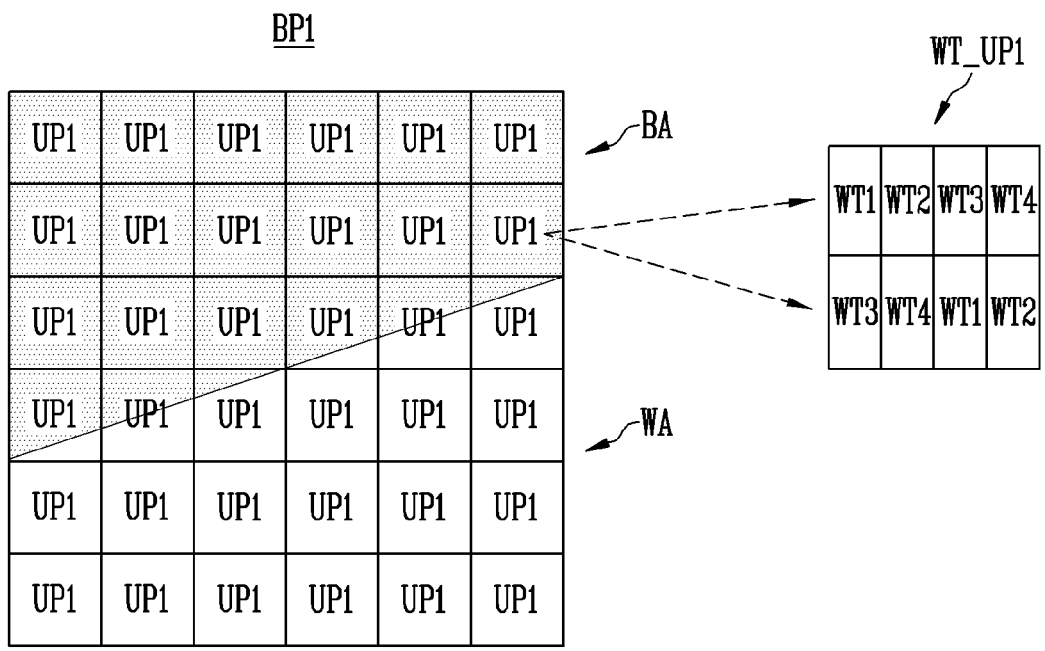
FIG. 6 is a diagram for explaining an example of calculating the simulation grayscale data based on the unit pattern and the boundary pattern.

FIG. 5 is a flowchart illustrating an example of a method of calculating simulation grayscale data in the method of FIG. 1. FIG. 6 is a diagram for explaining an example of calculating the simulation grayscale data based on the unit pattern and the boundary pattern.

Referring to FIGS. 3A, 5, and 6, a method of calculating simulation grayscale data may include implementing the size of the boundary pattern by repeatedly arranging the unit pattern (S220); determining a weight of each of the pixels included in the unit pattern based on an area of each of the pixels (S240); and obtaining the simulation grayscale data by applying the weight of each of the pixels corresponding thereto to grayscale values of coordinates of the grayscale map (S260).

Hereinafter, an example in which the first unit pattern UP1 is applied to the first boundary pattern BP1 will be mainly described.

When the first boundary pattern BP1 is determined, the first boundary pattern BP1 may be implemented to be expressed by repeatedly arranging the first unit pattern UP1 (S220). For example, as shown in FIG. 6, the first boundary pattern BP1 may be expressed as a 6×6 arrangement of first unit patterns UP1. Some of the first unit patterns UP1 may have a black grayscale value to represent the black area BA, and some of the first unit patterns UP1 may have a white grayscale value to represent the white area WA. The first unit patterns UP1 of a portion corresponding to the boundary line of the inclined shape may have grayscale values between black and white by rendering.

As described with reference to FIG. 3A, the first boundary pattern BP1 may include two first sub-unit patterns SUP1 and two second sub-unit patterns SUP2. For example, the first boundary pattern BP1 may include pixels in 2 rows and 4 columns. As shown in FIG. 3, the first pixel PX1, the second pixel PX2, the third pixel PX3, and the fourth pixel PX4 may be sequentially arranged in a first row, and the third pixel PX3, the fourth pixel PX4, the first pixel PX1, and the second pixel PX2 may be sequentially arranged in a second row. Coordinates may be set according to the pixel arrangement, and the grayscale values corresponding to the coordinates may be determined by rendering for implementing the first boundary pattern BP1.

The weight of each of the pixels may be determined based on the selected unit pattern (S240). In an embodiment, the weight may be determined based on an area (or a relative area) of the pixel.

As shown in FIGS. 3A and 3B, at least one of areas (for example, areas of the emission areas) of the first to fourth pixels PX1 to PX4 may be designed differently from the rest. For example, in the first unit pattern UP1, the emission areas of the second and fourth pixels PX2 and PX4 may be smaller than the emission area of the first pixel PX1, and the emission area of the first pixel PX1 may be smaller than the emission area of the third pixel PX3.

When the emission area for each color is different, the amount of emission of the pixels may be different. Therefore, it may be difficult to express a desired color when implementing a color, such as full-white, by an additive color mixture of red, green, and blue. That is, in order to improve image quality, the weight may be additionally applied to the grayscale value based on the area of the pixel.

For example, the weight of the second pixel PX2 having a relatively small area may be greater than the weight of the third pixel PX3 having a relatively large area.

For example, weight data according to the boundary pattern may be predetermined. When the first boundary pattern BP1 is selected, first boundary pattern weights WT_UP1 may be selected. The first boundary pattern weights WT_UP1 may include a first weight WT1 corresponding to the first pixel PX1, a second weight WT2 corresponding to the second pixel PX2, a third weight WT3 corresponding to the third pixel PX3, and a fourth weight WT4 corresponding to the fourth pixel PX4. The first boundary pattern weights WT_UP1 may be applied to grayscale data of corresponding pixels of the first boundary pattern BP1, respectively.

The simulation grayscale data may be obtained by applying the weight of each of the pixels PX1 to PX4 to the grayscale values of the coordinates of the grayscale map (S260).

The simulation grayscale data may be calculated by a product of a grayscale value of each of the coordinates and a weight of a corresponding coordinate. Accordingly, the simulation grayscale data may be substantially the same as grayscale data for emitting light in the boundary pattern of an actual display panel.

Based on the simulation grayscale data, the sharpness of the image boundary implemented by the selected unit pattern (that is, the pixel arrangement structure) and the rendering method may be numerically calculated.

Figure 7:
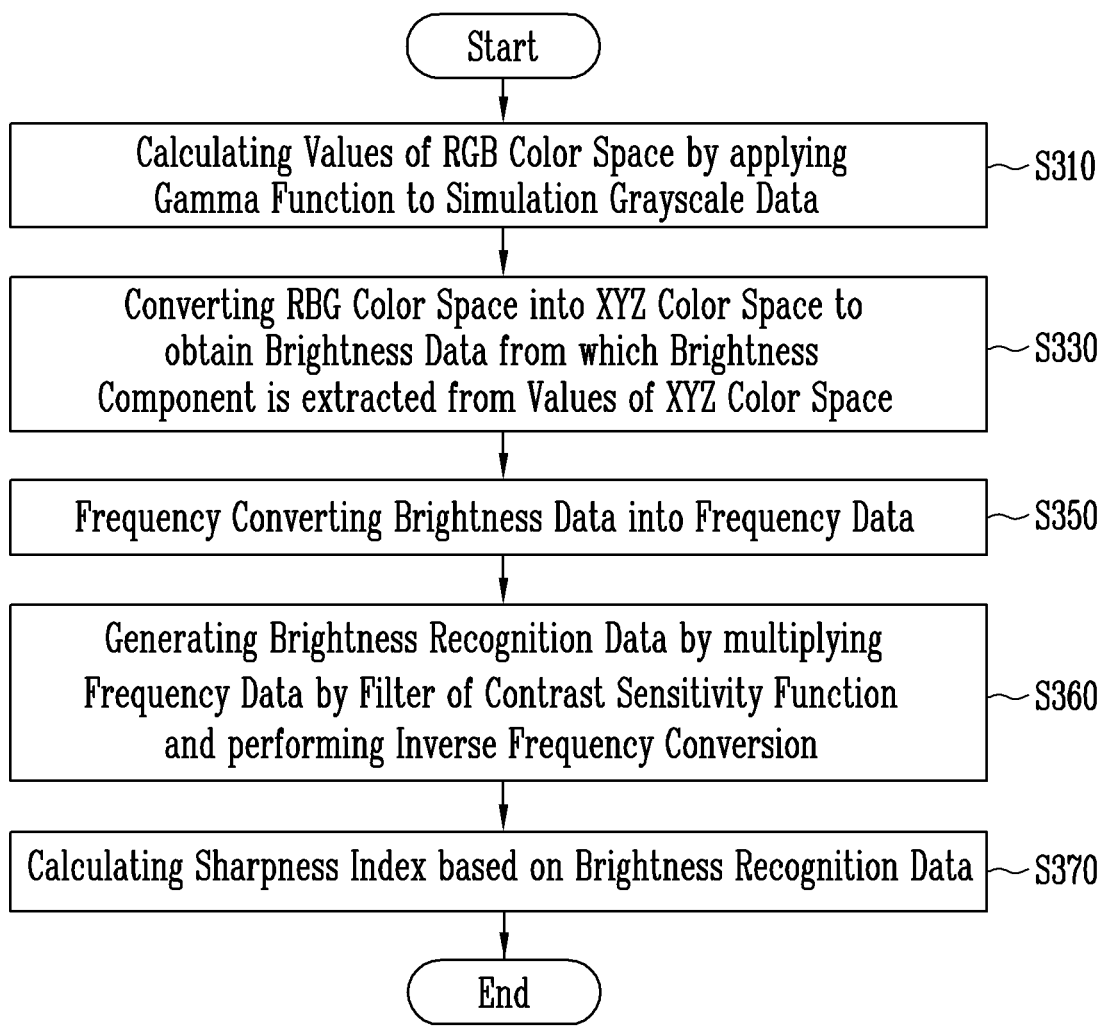
FIG. 7 is a flowchart illustrating an example of a method of obtaining a sharpness index in the method of FIG. 1.
Figure 8:
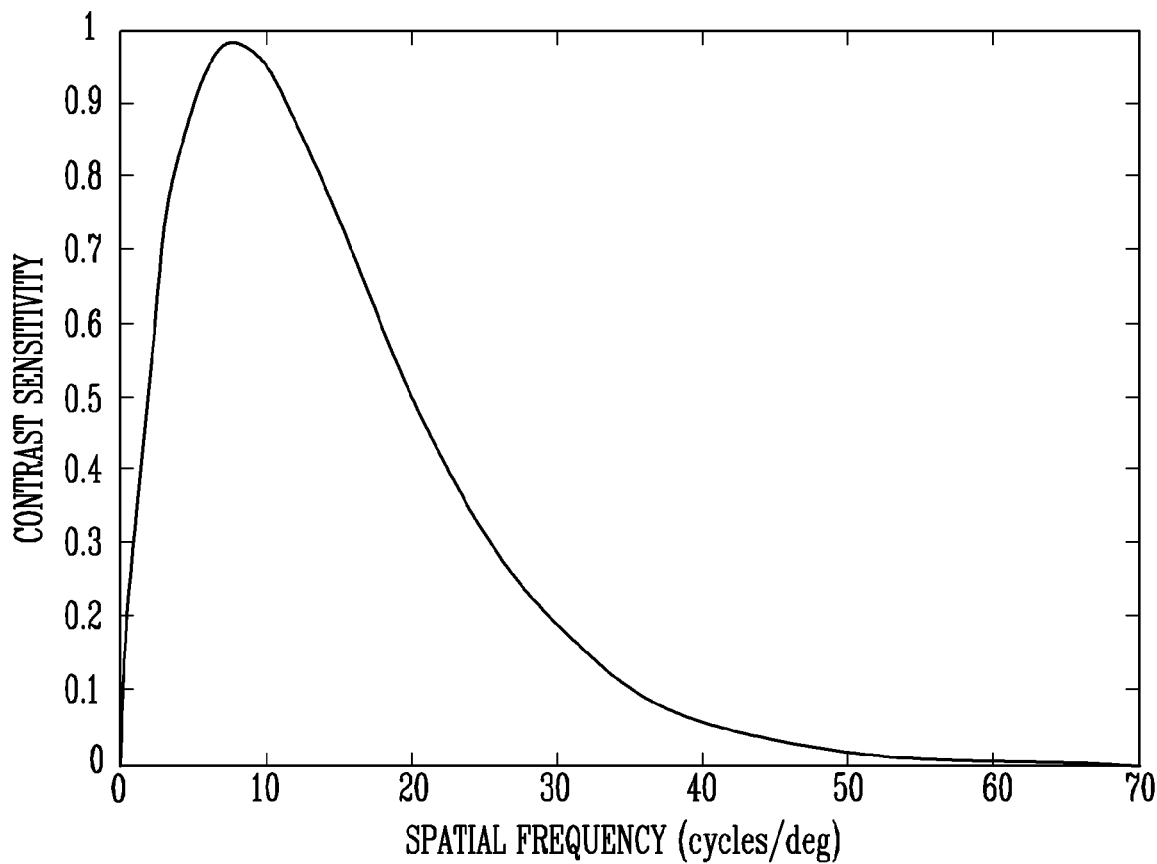
FIG. 8 is a graph illustrating an example of a contrast sensitivity function applied to calculate the sharpness index.
Figure 9:
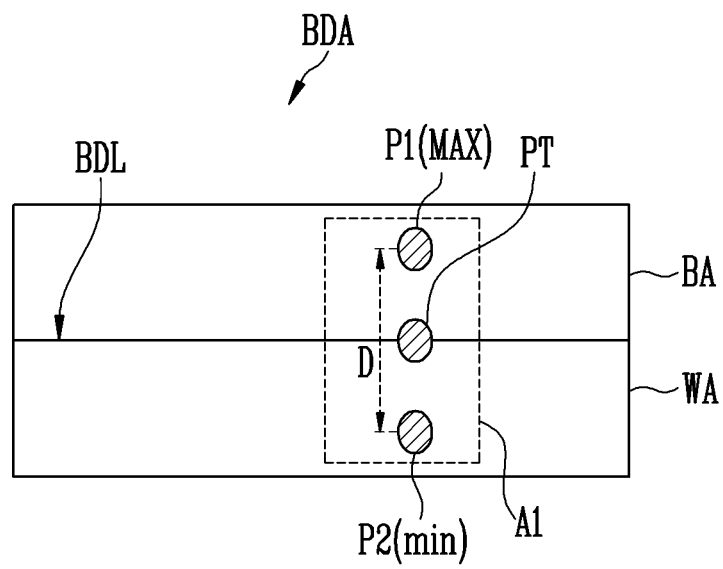
FIG. 9 is a diagram for explaining an example of a method of calculating the sharpness index of a point set on a boundary line of an image.

FIG. 7 is a flowchart illustrating an example of a method of obtaining a sharpness index in the method of FIG. 1. FIG. 8 is a graph illustrating an example of a contrast sensitivity function applied to calculate the sharpness index. FIG. 9 is a diagram for explaining an example of a method of calculating the sharpness index of a point set on a boundary line of an image.

Referring to FIGS. 7 to 9, a method of obtaining a sharpness index of an image boundary may include obtaining the brightness data from the simulation grayscale data (S310 and S330), frequency converting the brightness data into frequency data (S350), generating brightness recognition data by multiplying the frequency data by a filter of the contrast sensitivity function and performing inverse frequency conversion (S360), and calculating the sharpness index based on the brightness recognition data (S370).

In an electronic device including a display device, the size and resolution (for example, PPI) of a screen, the viewing distance, and the like may act as variables depending on the purpose of use. These variables may particularly relate to visual perception characteristics. The human eye does not see things as they are, but perceives information that is partially distorted.

For example, the human eye can perceive information through photoreceptors distributed in the retina. Due to physiological characteristics of the photoreceptor, sensory sensitivity of the photoreceptor may vary depending on the frequency component of a signal (or an image), and may respond most sensitively at an intermediate frequency. For example, as shown in FIG. 8, physiological frequency sensitivity of the photoreceptor may be modeled by the contrast sensitivity function (CSF). For example, in FIG. 8, the horizontal axis of the contrast sensitivity function may indicate spatial frequency of a visual stimulus given in units of cycles/degree, and the vertical axis may indicate normalized contrast sensitivity. According to the contrast sensitivity function, the human eye may respond with the most sensitivity in an intermediate frequency band, and may have low sensitivity in a high frequency band.

The method of simulating the sharpness of an image boundary according to the embodiments of the present invention may convert a boundary image in consideration of such visual perception characteristics. Accordingly, in order to convert the simulation grayscale data into image data in consideration of visual characteristics, it may be necessary to convert the simulation grayscale data expressed in RGB into the frequency data.

In an embodiment, in order to obtain the brightness data, values of an RGB color space may be calculated by applying a gamma function to the simulation grayscale data (S310). For example, when a predetermined gamma value (or gamma function) is applied to grayscale data that is linearly expressed, numerical values of the RGB color space having a relationship between grayscale and luminance may be calculated. The RGB color space may include luminance values for each of red, green, and blue.

By converting the RGB color space into XYZ color space, brightness component may be extracted from values of the XYZ color space (S330). The extracted brightness components may be obtained as the brightness data. For example, data of the RGB color space may be obtained by linearly transforming data of the RGB color space. In addition, a Y component, which is the brightness component, may be extracted as the brightness data from data of the XYZ color space.

The brightness data may be frequency converted into the frequency data (S350). That is, in order to apply the filter of the contrast sensitivity function, domain of the brightness data may be converted.

Thereafter, the brightness recognition data may be generated by multiplying the frequency data by the filter of the contrast sensitivity function and performing inverse frequency conversion (S360). When the frequency data is multiplied by the filter of the contrast sensitivity function, new frequency data in which high-frequency and low-frequency components of the frequency data are reduced and mid-band frequency is relatively emphasized can be obtained.

The contrast sensitivity function may be selected from among various well-known functional formulas and applied. For example, the contrast sensitivity function may be selected from a CSF model (Barton model) proposed by Peter G. J. Barten, a CSF model (Daly model) proposed by Scott Daly, and the like. However, the setting of the contrast sensitivity function is not limited thereto, and may be determined based on various known models.

The contrast sensitivity function may vary according to a viewing distance that is a distance between a viewer and an image, a PPI of an image, a viewing angle, and the like. Accordingly, the viewing distance, the PPI of the image, and the viewing angle may be input as variables for setting the contrast sensitivity function, and the contrast sensitivity function may be determined based thereon. For example, under the conditions of the same PPI, viewing distance, and viewing angle, the sharpness of the boundary according to a structure of the unit pattern may be calculated, and an optimal unit pattern structure and rendering method under the conditions can be derived. Accordingly, an optimal pixel structure (unit pattern) and rendering method may be selected for target products having different PPIs and viewing distances, such as smartphones, tablets, TVs, monitors, and wearable devices.

The new frequency data to which the filter of the contrast sensibility function is applied may be inversely frequency converted to generate brightness recognition data of a spatial domain. That is, the brightness recognition data may indicate a new image in which the mid-band frequency is emphasized. Such brightness recognition data may be understood as image data in consideration of the human visual perception characteristics. The brightness recognition data may include perceived brightness information according to a position within the boundary pattern. That is, the perceived brightness information may be brightness perceived by a real person, not from an image.

The sharpness index may be calculated based on a maximum value, a minimum value, a position corresponding to the maximum value, and a position corresponding to the minimum value of the brightness recognition data in a boundary area corresponding to a boundary line BDL of the boundary pattern (S370). In an embodiment, as shown in FIG. 9, a boundary area BDA may be set (or extracted) around the boundary line BDL between the black area BA and the white area WA. That is, the boundary area BDA may be a predetermined margin area based on the boundary line BDL, and may include a portion of the black area BA and a portion of the white area WA adjacent to the boundary line BDL.

The sharpness at an extraction point PT set on the boundary line BDL may be calculated based on the brightness recognition data in an area A1 set around the extraction point PT. In an embodiment, a maximum value MAX of the brightness recognition data within the area A1 corresponding to the extraction point PT, a first position P1 that is a position having the maximum value MAX, a minimum value min, and a second position P2 that is a position having the minimum value min may be extracted. The sharpness at the extraction point PT may be numerically calculated by Equation 1 below.

$$SI=(MAX-min)/D \qquad \text{[Equation 1]}$$

Here, SI may be the sharpness index at the extraction point PT, MAX may be the maximum value of the brightness recognition data, min may be the minimum value of the brightness recognition data, and D may be the distance between the first position P1 and the second position P2. For example, the sharpness index at the extraction point PT may be derived as a value obtained by dividing a difference between the maximum value MAX and the minimum value min of the brightness recognition data within the area A1 by the distance D between the first position P1 and the second position P2.

Accordingly, the greater the difference between the maximum value MAX and the minimum value min and/or the smaller the distance D between the first position P1 and the second position P2, it can be understood that the sharpness index is large and perceived brightness at the boundary line changes rapidly. The larger the sharpness index, it can be interpreted as a sharp boundary image in which the black-and-white boundary is recognized more clearly. In addition, since the sharpness index is quantitatively determined, design optimization of the display device may be improved.

Figure 10:
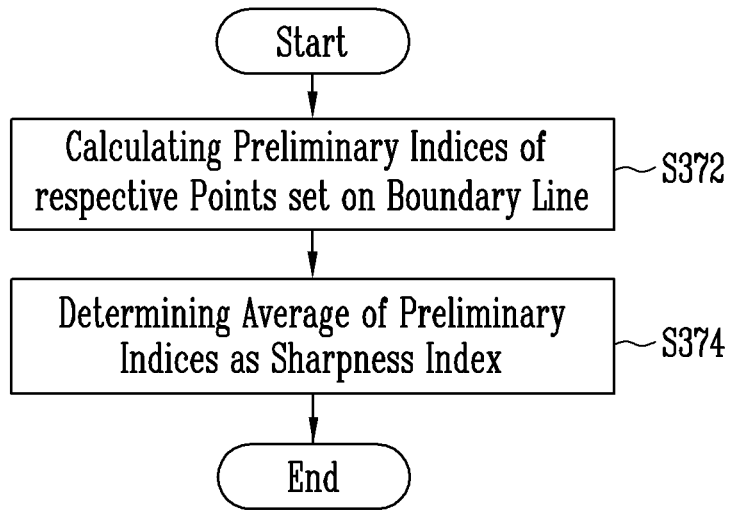
FIG. 10 is a flowchart illustrating an example of a method of calculating the sharpness index of FIG. 7.
Figure 11:
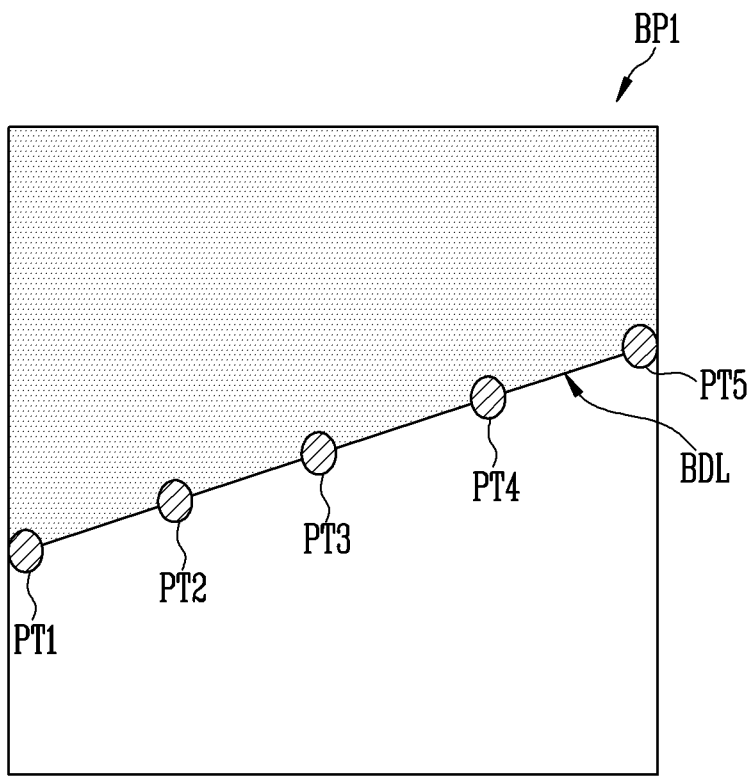
FIG. 11 is a diagram for explaining an example of the method of calculating the sharpness index of FIG. 10.
Figure 12:
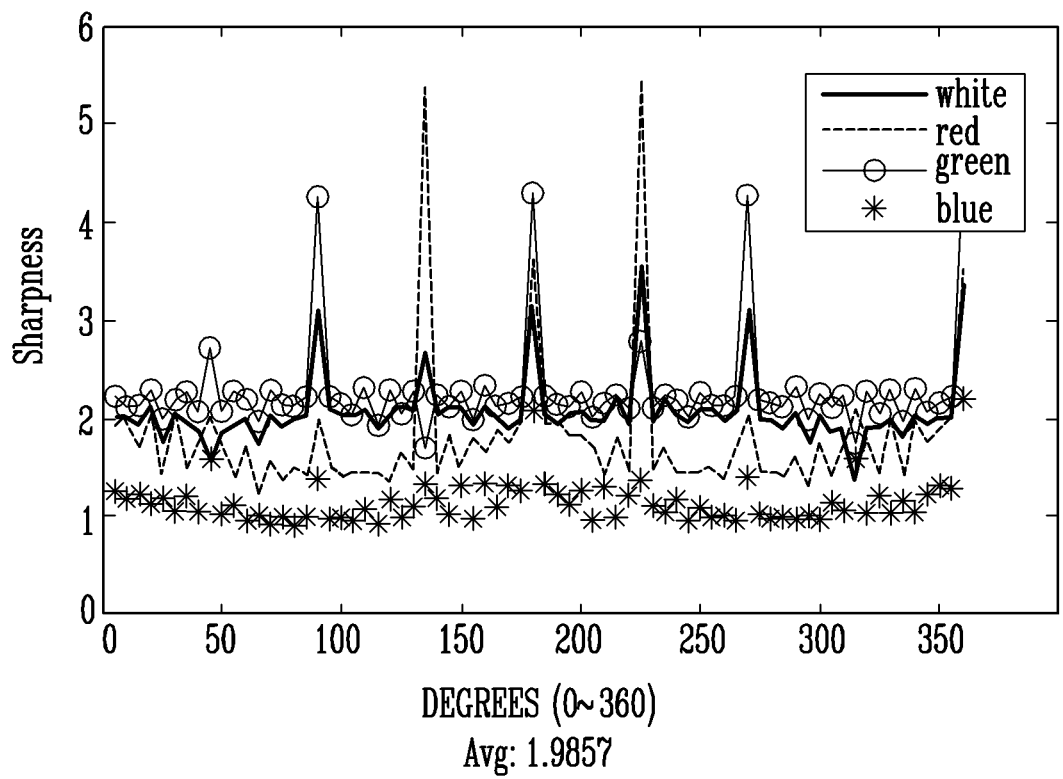
FIG. 12 is a diagram illustrating an example of a simulation result of the sharpness index output by the method of FIG. 1.

FIG. 10 is a flowchart illustrating an example of a method of calculating the sharpness index of FIG. 7. FIG. 11 is a diagram for explaining an example of the method of calculating the sharpness index of FIG. 10. FIG. 12 is a diagram illustrating an example of a simulation result of the sharpness index output by the method of FIG. 1.

Referring to FIGS. 7, 9, 10, 11, and 12, a method of calculating the sharpness index may include calculating preliminary indices that are sharpness indices of each of points PT1 to PT5 set on the boundary line BDL (S372) and determining an average of the preliminary indices as the sharpness index of the boundary line BDL (S374).

In an embodiment, as shown in FIG. 11, the preliminary indices for first to fifth points PT1 and PT5 may be calculated (S372). The preliminary indices may be calculated based on the method described with reference to FIG. 9 and Equation 1, respectively. Although only five points are shown in FIG. 11, the inventive concepts are not limited thereto.

In addition, the average of the preliminary indices may be determined as the sharpness index of the boundary line BDL (S374). For example, FIG. 11 shows the first boundary pattern BP1, and the sharpness index of the boundary line BDL of the first boundary pattern BP1 may be finally calculated.

In an embodiment, as the boundary line of the boundary pattern rotates at a predetermined angle, the sharpness index for each boundary line angle may be calculated. For example, the grayscale values of the grayscale map may be changed according to the boundary line of the boundary pattern that changes in units of 5 degrees. Since the grayscale map is changed, the sharpness index calculated based thereon may also be changed according to the boundary line angle. The sharpness index corresponding to each boundary line angle may be obtained by the method (or algorithm) described with reference to FIGS. 1 to 11.

FIG. 12 shows an example of the sharpness calculated based on Equation 1 according to the boundary line angle. For example, sharpness indices may be calculated in units of 5 degrees in a range of 0 degrees to 360 degrees. Also, data related to the sharpness of each of red, green, blue, and white data may be calculated.

In practice, the black-and-white boundary may be related to sharpness data (for example, sharpness index) of white. Accordingly, an average of the sharpness indices of white derived from each of boundary line angles may be simulated as the sharpness of the boundary image in a display device to which the corresponding pixel structure (that is, the unit pattern) and rendering method are applied. For example, FIG. 12 shows an example in which the sharpness of the boundary image is calculated as 1.9857.

As described above, the method for simulating the sharpness of an image boundary according to the embodiments of the present invention may quantitatively calculate the sharpness of the black-and-white boundary by reflecting the visual perception characteristics in the boundary image determined based on the pixel structure (unit pattern) and the rendering method before manufacturing the pixel. Accordingly, the cost of designing the pixel may be reduced, and the optimal pixel structure and rendering method that meet the purpose of the display device may be easily determined through simulation. In addition, according to the method of simulating the sharpness of an image boundary of the present invention, the image quality of the display device may be improved.

Figure 13:
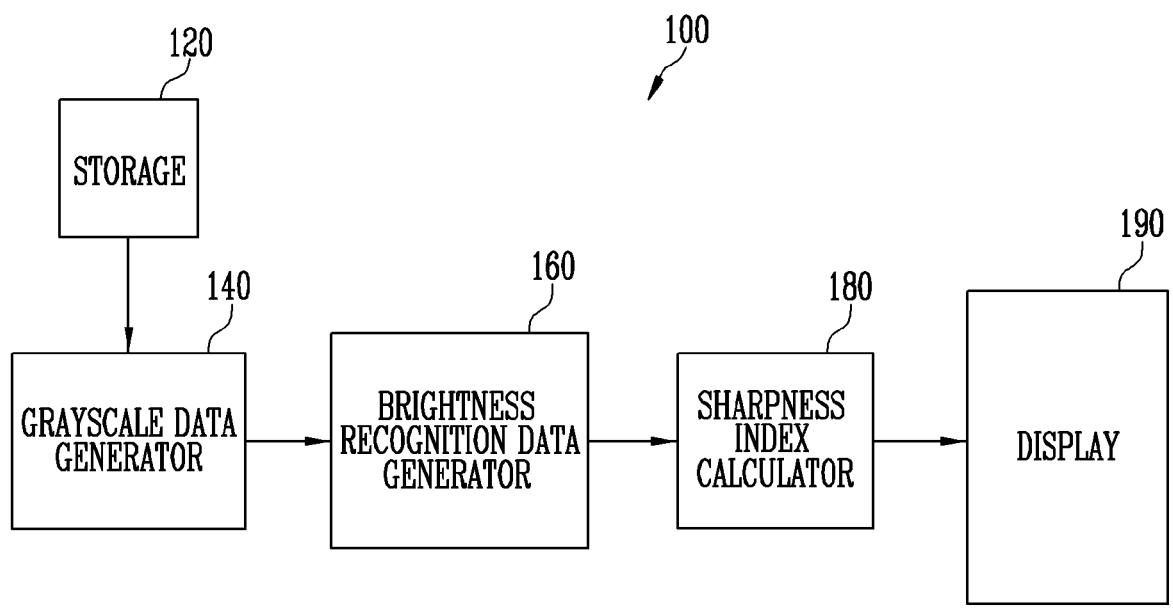
FIG. 13 is a block diagram illustrating an apparatus for simulating sharpness of an image boundary according to embodiments of the present invention.

FIG. 13 is a block diagram illustrating an apparatus for simulating sharpness of an image boundary according to embodiments of the present invention.

Referring to FIG. 13, an apparatus 100 for simulating sharpness of an image boundary may include a storage 120, a grayscale data generator 140, a brightness recognition data generator 160, and a sharpness index calculator 180. The apparatus 100 for simulating the sharpness of an image boundary may further include a display unit 190 for outputting a simulation result. In addition, the apparatus 100 may further include an input device for inputting simulation conditions and the like.

The storage 120 may store unit patterns including pixel arrangement information. Also, the storage 120 may store rendering filters applied to a boundary pattern. For example, the storage 120 may include a non-volatile memory.

In an embodiment, the grayscale data generator 140, the brightness recognition data generator 160, and the sharpness index calculator 180 may be implemented with a hardware and/or software algorithm for implementing the method of simulating the sharpness of an image boundary described with reference to FIGS. 1 to 12.

The grayscale data generator 140 may calculate simulation grayscale data using a boundary pattern including a boundary line between black and white and a unit pattern including arrangement information of pixels. The grayscale data generator 140 may select the boundary pattern and the unit pattern from the storage 120 in response to an input signal provided from outside.

In an embodiment, the grayscale data generator 140 may calculate a grayscale map by applying a rendering filter corresponding to the unit pattern to the selected boundary pattern, and calculate the simulation grayscale data by applying a weight corresponding to pixels of the unit pattern to grayscale values of the grayscale map.

Also, the grayscale data generator 140 may generate boundary patterns in which a boundary line angle is changed with respect to a reference boundary pattern, and calculate the simulation grayscale data for each of the boundary patterns. The simulation grayscale data may be provided to the brightness recognition data generator 160.

The brightness recognition data generator 160 may extract brightness data from the simulation grayscale data, and generate brightness recognition data based on the brightness data and a contrast sensitivity function.

In an embodiment, the brightness recognition data generator 160 may calculate values of an RGB color space by applying a gamma function to the simulation grayscale data, and convert the RGB color space into an XYZ color space to obtain the brightness data from which a brightness component is extracted from values of the XYZ color space. Also, the brightness recognition data generator 160 may frequency convert the brightness data into frequency data, and generate the brightness recognition data by multiplying the frequency data by a filter of the contrast sensitivity function and performing inverse frequency conversion.

The brightness recognition data generator 160 may determine the contrast sensitivity function based on a pixel per inch (PPI) of an image, a viewing distance of a viewer, and a viewing angle.

The sharpness index calculator 180 may calculate the sharpness index based on a difference between a maximum value and a minimum value of the brightness recognition data in a predetermined boundary area corresponding to a boundary line of the boundary pattern.

In an embodiment, the sharpness index calculator 180 may calculate preliminary indices that are sharpness indices of each of points set on the boundary line, and determine an average of the preliminary indices as the sharpness index. For example, a preliminary index of a first point of the boundary line may be derived as a value obtained by dividing the difference between the maximum value and the minimum value of the brightness recognition data within an area set based on (or, around) the boundary line by a distance between a position corresponding to the maximum value and a position corresponding to the minimum value (refer to Equation 1).

Since the detailed operation of the apparatus for simulating the sharpness of an image boundary has been described in detail with reference to FIGS. 1 to 12, duplicate descriptions will be omitted.

As described above, the method and apparatus for simulating the sharpness of an image boundary according to the embodiments of the present invention may quantitatively calculate the sharpness of the black-and-white boundary by reflecting the visual perception characteristics in the boundary image determined based on the pixel structure (unit pattern) and the rendering method before manufacturing the pixel. Therefore, it is possible to simulate the sharpness of the black-and-white boundary without testing the sharpness and image quality for the actually designed and manufactured pixel, and the cost of designing the pixel may be reduced. In addition, the optimal pixel structure and rendering method that meet the purpose of the display device may be easily determined through simulation. According to the method and apparatus for simulating the sharpness of an image boundary of the present invention, the image quality of the display device may be improved.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method for simulating sharpness of an image boundary, the method comprising:
setting a boundary pattern including a boundary line between black and white, and a unit pattern including arrangement information of pixels;
calculating simulation grayscale data for implementing the boundary pattern by using the unit pattern; and
obtaining a sharpness index for the boundary line based on a contrast sensitivity function (CSF) and brightness data extracted from the simulation grayscale data,
wherein:
the setting the boundary pattern and the unit pattern includes:
outputting the unit pattern from a storage;
selecting a rendering filter for the boundary pattern based on the unit pattern; and
calculating a grayscale map corresponding to the boundary pattern based on the rendering filter; and
the calculating the simulation grayscale data includes:
implementing a size of the boundary pattern by repeatedly arranging the unit pattern;
determining a weight of each of the pixels based on an area of each of the pixels included in the unit pattern; and
obtaining the simulation grayscale data by respectively applying the weight of each of the pixels to grayscale values of coordinates of the grayscale map.

2. The method of claim 1, wherein data of each coordinate of the simulation grayscale data is a product of a grayscale value of that coordinate and the weight.

3. A method for simulating sharpness of an image boundary, the method comprising:
setting a boundary pattern including a boundary line between black and white, and a unit pattern including arrangement information of pixels;
calculating simulation grayscale data for implementing the boundary pattern by using the unit pattern; and obtaining a sharpness index for the boundary line based on a contrast sensitivity function (CSF) and brightness data extracted from the simulation grayscale data,
wherein:
the setting the boundary pattern and the unit pattern includes:
outputting the unit pattern from a storage;
selecting a rendering filter for the boundary pattern based on the unit pattern; and
calculating a grayscale map corresponding to the boundary pattern based on the rendering filter; and
the obtaining the sharpness index includes:
obtaining the brightness data having a brightness component extracted from the simulation grayscale data;
frequency converting the brightness data into frequency data;
generating brightness recognition data by multiplying the frequency data by a filter of the contrast sensitivity function and performing inverse frequency conversion; and
calculating the sharpness index based on a maximum value of the brightness recognition data, a minimum value of the brightness recognition data, a position corresponding to the maximum value, and a position corresponding to the minimum value in a predetermined boundary area corresponding to the boundary line.

4. The method of claim 3, wherein the obtaining the brightness data includes:
calculating values of an RGB color space by applying a gamma function to the simulation grayscale data; and
converting the RGB color space into an XYZ color space to extract the brightness component from values of the XYZ color space.

5. The method of claim 3, wherein the predetermined boundary area is an area having a predetermined margin around the boundary line.

6. The method of claim 3, wherein the contrast sensitivity function is determined based on a pixel-per-inch (PPI) of an image, a viewing distance from a viewer, and a viewing angle.

7. The method of claim 6, wherein the calculating the sharpness index includes:
calculating preliminary indices that are sharpness indices of respective points set on the boundary line; and
determining an average of the preliminary indices as the sharpness index of the boundary line.

8. The method of claim 7, wherein a preliminary index of a first point of the boundary line is derived as a value obtained by dividing a difference between the maximum value of the brightness recognition data and the minimum value of the brightness recognition data within an area set around the boundary line by a distance between the position corresponding to the maximum value and the position corresponding to the minimum value.

9. The method of claim 3, wherein the boundary line of the boundary pattern is periodically rotated at a predetermined angle with respect to a predetermined reference boundary pattern.

10. The method of claim 9, wherein grayscale values of coordinates of the grayscale map are changed according to the rotation of the boundary line, and sharpness indices for boundary line angles are obtained.

11. The method of claim 10, wherein an average of the sharpness indices for the boundary line angles is determined as the sharpness index.

12. An apparatus for simulating sharpness of an image boundary comprising:
a storage storing unit patterns each including arrangement information of pixels;
a grayscale data generator calculating simulation grayscale data using a boundary pattern including a boundary line between black and white, and a selected unit pattern of the unit patterns;
a brightness recognition data generator extracting brightness component data from the simulation grayscale data and generating brightness recognition data based on the brightness component data and a contrast sensitivity function; and
a sharpness index calculator calculating a sharpness index based on a difference between a maximum value of the brightness recognition data and a minimum value of the brightness recognition data in a predetermined boundary area corresponding to the boundary line.

13. The apparatus of claim 12, wherein the grayscale data generator calculates a grayscale map by applying a rendering filter corresponding to the selected unit pattern to the boundary pattern, and calculates the simulation grayscale data by applying a weight corresponding to the pixels of the selected unit pattern to grayscale values of the grayscale map.

14. The apparatus of claim 12, wherein the grayscale data generator calculates the simulation grayscale data by changing a boundary line angle with respect to a predetermined reference boundary pattern.

15. The apparatus of claim 12, wherein the brightness recognition data generator calculates values of an RGB color space by applying a gamma function to the simulation grayscale data, converts the RGB color space into an XYZ color space to obtain the brightness component data having a brightness component extracted from values of the XYZ color space, frequency converts the brightness component data into frequency data, and generates the brightness recognition data by multiplying the frequency data by a filter of the contrast sensitivity function and performing inverse frequency conversion.

16. The apparatus of claim 15, wherein the brightness recognition data generator determines the contrast sensitivity function based on a pixel per inch (PPI) of an image, a viewing distance from a viewer, and a viewing angle.

17. The apparatus of claim 15, wherein the sharpness index calculator calculates preliminary indices that are sharpness indices of respective points set on the boundary line, and determines an average of the preliminary indices as the sharpness index.

18. The apparatus of claim 17, wherein a preliminary index of a first point of the boundary line is derived as a value obtained by dividing a difference between the maximum value of the brightness recognition data and the minimum value of the brightness recognition data within an area set around the boundary line by a distance between a position corresponding to the maximum value and a position corresponding to the minimum value.

* * * * *